April 23, 1957 F. M. MAYES 2,790,137
ELECTRICAL PROSPECTING METHOD AND APPARATUS
Filed June 12, 1953 4 Sheets-Sheet 1

INVENTOR.
FRED M. MAYES
BY
ATTORNEYS

FIG. 5.

INVENTOR.
FRED M. MAYES

April 23, 1957 F. M. MAYES 2,790,137
ELECTRICAL PROSPECTING METHOD AND APPARATUS
Filed June 12, 1953 4 Sheets-Sheet 3

FIG. 6.

INVENTOR.
FRED M. MAYES
BY
ATTORNEYS

FIG. 7.

United States Patent Office 2,790,137
Patented Apr. 23, 1957

2,790,137

ELECTRICAL PROSPECTING METHOD AND APPARATUS

Fred M. Mayes, Newtown Square, Pa., assignor to Sun Oil Company, Philadelphia, Pa., a corporation of New Jersey Application June 12, 1953, Serial No. 361,314

9 Claims. (Cl. 324—1)

This invention relates to electrical prospecting methods and apparatus. The invention particularly relates to the utilization of special electrode configurations in electrical prospecting. While the invention is not limited thereto, it is applicable to novel prospecting methods and apparatus disclosed in the application of Grace Davie Pearson, executrix of the estate of John M. Pearson, Serial No. 361,361, filed June 12, 1953, and the invention will be described specifically in connection with the method and apparatus of said application.

The art of electrical prospecting has been highly developed, but various deficiencies exist in presently known methods.

The majority of the known methods involve repeated measurements over extended areas of the earth's surface and give results which are due to numerous anomalies with the result that interpretation is a matter of great difficulty. To avoid troubles in interpretation, there has been proposed a method of prospecting involving general symmetry of the electrical configuration employed, this method being based on the proper assumption that if potentials are measured between electrodes which are symmetrically located with respect to current-introducing electrodes, then in a homogeneous medium the potential between the potential electrodes should be zero. If the potential is not zero, there is indicated an asymmetrical condition in the earth and a determination of the location of the asymmetry may be obtained, for example, by displacing one of the potential electrodes to obtain a zero potential output. The displacement of the electrode then gives an indication of asymmetry from which deductions of significance may be made.

Experience has shown that in the earth there exist quite generally stray currents which contain direct components and usually components of power line frequency. Besides these components, however, there is much electrical noise having frequencies ranging, in particular, downwardly from about 20 cycles per second. The fact that these frequencies exist in the earth is indicative of the fact that currents at these frequencies have substantial penetrative power. In fact, theoretical considerations lead directly to the conclusion that in order to detect deep seated anomalies it would be necessary to employ, as the exciting current, current of frequencies as low as only a fraction of a cycle per second. Higher frequencies even with very great spacing of electrodes are very rapidly attenuated with depth. Measurements made at low frequencies and utilizing direct current are generally, however, difficult, in particular because of the low frequency electrical noise mentioned above and the stray direct current fluctuations in the earth.

Said Pearson application relates to the provision of methods and apparatus for the utilization of quite low frequencies in electrical prospecting.

In general, the low frequencies are not desirably employed by way of input of sinusoidal low frequency current. Rather, it is desirable to impose on the earth rectangular waves of low frequency and to determine the transients to which they give rise. The detection of transients for purposes of electrical prospecting has been proposed. However, as such methods were carried out there have generally been measured only those transients which occur shortly after the current disturbance which causes them. For example, oscilloscope traces have been obtained which only extend for a period of the order of 50 milliseconds after the initial originating transient. The reason for this has been that transients of greater delay are difficult to detect in view of the low frequency noise referred to above. Theoretical considerations show that unless the transients are measured following quite long intervals after the initiating transient, there cannot be expected any results which would be significant of deep lying anomalies.

Said Pearson application is concerned with the measurement of transients delayed for long periods after their initiation. This result is achieved, not by attempting to measure or detect a single transient, but rather by sampling of repeated transients, utilizing apparatus which provides synchronous rectification and integration of the results occurring from a relatively large number of cycles of operation. By utilizing such a method, the noise of both low alternating frequencies and due to direct currents is suppressed to a very considerable extent in the results. By repeated sampling it is possible to determine the entire characteristics of a transient over a period of long duration.

In many instances, however, it is not necessary to determine a complete transient, but rather there may be determined the time delays which are involved in obtaining indications of an asymmetrical electrical condition in the earth. For example, suppose it is assumed that the earth in the vicinity of the surface is uniform, but that there exists a deep anomaly. Under these circumstances, a symmetrical electrical configuration of the type mentioned above may fail to exhibit any potential difference between symmetrically arranged pickup electrodes when the excitation is at higher frequencies or when transient conditions are set up and only the initial portions of transients are detected and measured. Such a result would be consistent with theory in that the electrical results would be obtained only from origins nearer to the surface than the existing anomaly. However, by the use of lower frequencies, and by the measurement of transient conditions after long delays following the transient initiation, there may be detected the existence of potentials between symmetrically arranged potential electrodes which would be indicative of deep seated anomalies. As will be apparent hereafter, the method and apparatus of said Pearson application is designed to detect such deep seated anomalies by making possible the measurement of the asymmetrical electrical conditions which exist. Furthermore, it is possible to get indications of the depth of the anomalies.

As will become apparent from the following description, which corresponds to that of said Pearson application, apparatus may be provided which is subject to many variations in use and through its use explorations may be made, for example, first to detect minor anomalous conditions and then to seek to magnify the results due thereto so as to secure information of maximum value.

Said method and apparatus are furthermore usable in electrical prospecting involving the location of current and/or potential electrodes in a borehole and in particular may be used for the determination of the dip and strike of formations in the vicinity of the borehole or of faults or other anomalies which exist within reasonable distances therefrom.

The primary object of the present invention is the provision of electrode configurations minimizing the appearance in the measured results of effects of stray earth currents in contrast with those of intentionally produced earth currents. In brief the attainment of this object involves the provision of a symmetrical array of potential electrodes with measurements of potentials between pairs thereof and addition of such measurements to cancel out such potential components as would arise due to currents flowing uniformly in the region of the electrodes.

This broad object and other objects of the invention particularly relating to details of construction and operation of apparatus, will become apparent from the following description read in conjunction with the accompanying drawings in which.

Figure 1:
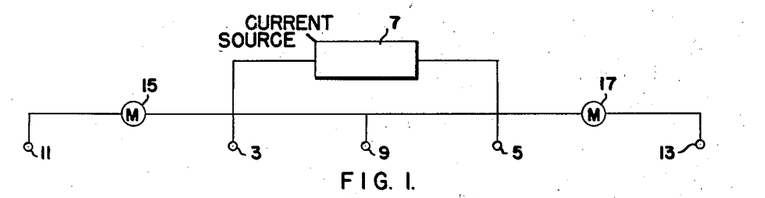
Figure 1 is a diagram illustrating an electrode arrangement on or adjacent to the surface of the earth which may be provided in accordance with the invention.
Figure 2:
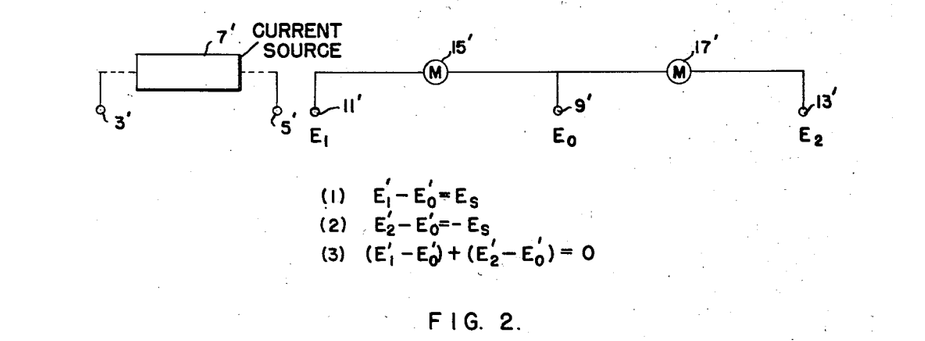
Figure 2 is a diagram illustrating generalization of the electrode arrangement of Figure 1 provided in accordance with the invention, together with equations showing the elimination from measurements of major earth current effects.

Referring to Figures 1 and 2, the former shows an electrode configuration of symmetrical form provided in accordance with the invention, while the latter shows a similar electrode configuration but of generalized form. Referring first to Figure 1, current electrodes are provided at 3 and 5 fed with current from a source 7. Midway between electrodes 3 and 5 is a potential electrode 9. In the line of electrodes 3, 5 and 9 are potential electrodes 11 and 13, symmetrically arranged relatively to electrode 9. Meters 15 and 17 are indicated as measuring the potentials of electrodes 11 and 13, respectively, relative to electrode 9. As will be apparent hereafter, the "meters" 15 and 17 which are provided may actually consist of relatively complex apparatus, and the source 7 is likewise of considerable complexity. However, for the present, it may be assumed, for purposes of simplicity of description, that the source 7 might be merely a battery, and the meters 15 and 17 merely voltmeters. The ultimate measurement is the algebraic sum of the potentials of the electrodes 11 and 13 relative to that of electrode 9, obtainable by adding the potential readings of the meters 15 and 17, or, equivalently, using the appartus hereafter described to give the same result. While in Figure 1 the current electrodes 3 and 5 are shown as symmetrically arranged with respect to the potential electrodes, there is no requirement that this should be the case, and Figure 2 shows a more general arrangement in which the primed electrodes correspond to those of Figure 1, but in which it will be noted that the current electrodes are actually outside the configuration of potential electrodes. As a matter of fact, the current electrodes may ocupy any desired positions, it being only desirable that a potential electrode should not be so close to a current electrode that such spacing would be small in comparison with the spacings of the current electrodes or the potential electrodes. The current electrodes may both be external to the potential electrode configuration, or one or both of them may be within that configuration either symmetrically or asymmetrically located with respect to the potential electrodes. Furthermore, they need not be in line with the potential electrodes but could be arranged transversely thereto or at various angles such as conditions encountered might indicate would give more significant results.

The advantage of the array of potential electrodes, irrespective of the location of the current electrodes, is that a disturbing current flowing through the earth, if substantially constant over the base length of the potential electrodes, will give rise to equal and opposite potentials at electrodes 11' and 13' with respect to electrode 9'. The potentials at the respective electrodes 11', 9' and 13' are indicated in Figure 2 as $E_1$, $E_0$ and $E_2$, respectively. On the assumption that electrodes 11' and 13' are spaced equally from, and on opposite sides of, electrode 9', then an earth current which is uniform in the region of the electrodes, may be considered as giving rise to a gradient which is represented in the equations in Figure 2 as involving a potential $E_s$ between electrode 11' and electrode 9', and also between electrode 9' and electrode 13'. Designating with primes the components of the potentials $E_1$, $E_0$ and $E_2$ which are due to the earth current, there follow the Equations 1 and 2 given in Figure 2. If the elecrode potential differences are added, the result is Equation 3 showing that the potential due to the earth current, $E_s$, vanishes from the sum. This result follows irrespective of the arrangement of the current electrodes. The compensation will not be complete if the earth resistivity in the vicinity of the surface is not uniform or if there is some time delay between the signals at electrodes 11' and 13'. While absence of compensation may itself be significant, the primary object of this electrode array is to remove, or at least minimize, effects of disturbing current.

Referring for simplicity of description to the completely symmetrical array of Figure 1, as to artificial conditions set up by current introduced at 3 and 5, it will be evident that homogeneity will result in an average value of the potentials at 11 and 13 equal to that at 9, i. e., the potential at 11 will be above (or below) that at 9 to the same extent that the potential at 13 will be below (or above) that at 9. An anomaly will produce a deviation of this average which itself may be interpreted; or, alternatively, one of the electrodes 3 or 5 may be displaced in the line of the electrodes or associated with one or more fixed current electrodes switched selectively into the circuit to become a current electrode. As will be clear, the results would then be determination of a point of current introduction such as to cause the average of the potentials at 11 and 13 to be equal to that at 9, or the equivalent of such determination.

It will be evident that similar considerations apply to an arrangement of electrodes such as that in Figure 2 in which the current electrodes are not symmetrically placed with respect to the potential electrodes. Whatever the overall configuration may be, the interpretation of corresponding type may be made.

While the improved configurations which have been described may be used with no more than the introduction of direct, reversed, or alternating currents, with detection of corresponding potentials, such operation has substantial limitations. Whereas it is possible to detect anomalies at substantial depths by providing sufficient spread of the electrodes and introducing large currents, nevertheless, effective penetration to depth is limited to operation at direct current conditions or at low frequencies. Direct current conditions involve the difficulty of the presence of slowly varying direct stray currents in the earth. To the extent that these are not uniform over the region of the configuration, they introduce spurious potentials which are difficult to take into account. Such low frequencies as should be used for good penetration are in the range of ordinary noise in the earth and, hence, cannot be used with full success in accordance with such prior methods as have been applied to other configurations. Higher frequencies above the noise level provided only restricted penetration. How operation at very low frequencies may be successfully attained may be best made clear by considering first improved apparatus to be associated with the electrode configurations, such apparatus being of the type disclosed in said Pearson application.

Figure 5:
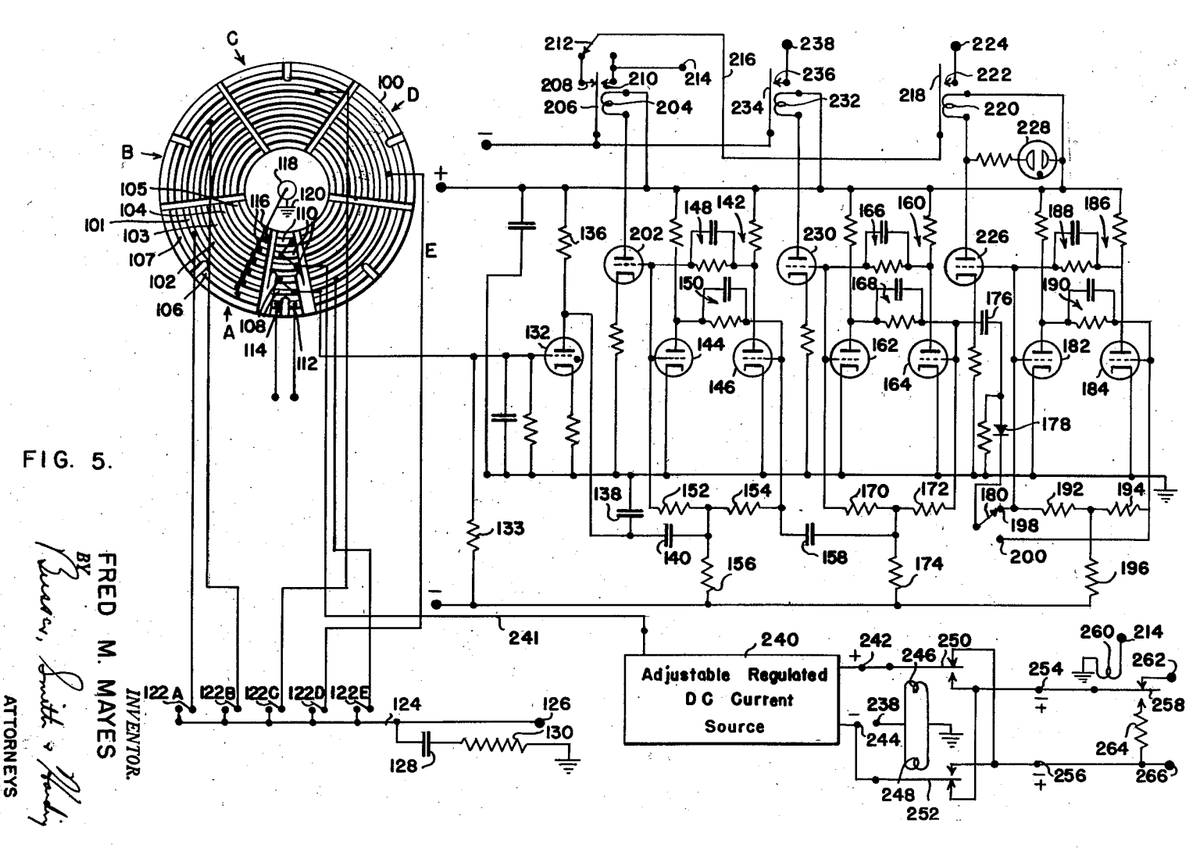
Figure 5 is a wiring diagram showing, in particular, a timing arrangement provided for establishing various periods in a cycle of operation.

The description of a preferred form of apparatus to be used in connection with the foregoing electrode configurations may be made with reference first to the timing mechanism particularly illustrated in Figure 5 which serves for the control of the cycles of operation. A commutator arrangement is provided by an insulating disc 100 which carries annular conducting members indicated at 101, 102, 103, 104 and 105 which are broken up into segments, including groups indicated at A, B, C, D and E, by radial grooves. As shown each of these conductors comprises five segments in the groups subtending somewhat over 300°, there being interposed between the ends of the series of segments special conducting segments indicated at 108 and 110. An outer array of segments is provided at 106 and 107, there being ten of these segments to provide double the number of divisions provided by the other segments. Similarly there are two segments 112 and 114 occupying the angular space of the segments 108 and 110. It may be noted that the segments 108 are of somewhat less circumferential extent than the segments 110.

A brush arrangement 116 is arranged to ground all of the segments at 120 through its shaft 118, the various brushes being in radial alignment. As will appear hereafter the shaft 118 which carries the brushes makes a complete revolution for every quarter cycle of operation of the apparatus. The shaft 118 should be driven at a constant but adjustable speed and to this end is desirably driven from a synchronous motor through a continuously variable speed mechanism of conventional type which is not shown. By changing the speed of shaft 118 the frequency of the repetition cycles may be varied between wide limits. In general it is desirable that there be provided variations from about 20 cycles per second downwardly to a small fraction of a cycle per second.

The various segments of the groups A to E, inclusive, are connected to switching arrangements so that for any particular annular array of segments the fraction of a quarter cycle in which there is grounding contact by a brush 116 may be varied at the choice of the operator. A typical array of switches is indicated at 122A, 122B, 122C, 122D and 122E, the switches being connected individually to the segments of the particular group 101 and to a common line 124 which connects with a terminal 126 hereafter described. A condenser 128 and resistance 130 provide for the effective grounding of high frequency transients. It will be noted that the switches are designated by the same letters as corresponding segments on the member 100. As will become evident by various switching arrangements and connections, duplicating and in addition to what is shown, a wide variety of characteristics of operation may be secured.

In the present instance the segments 108 are connected together and to the control grid of a thyratron 132, the anode of which is connected to a positive supply line through a high resistance 136 and to ground through a condenser 138. This arrangement is such that the condenser 138 is gradually charged through resistance 136 and then discharge occurs through the thyratron 132 when the grid is grounded by contact of brushes 116 with segments 108, the grid being normally at a negative potential maintained by the negative supply line through resistance 133. After initial discharge, and while brushes 116 continue in contact with segments 108, the thyratron will continue to pulse, but with low output. When the segments 108 become ungrounded, the thyratron remains deionized, due to negative potential on the grid, and the anode potential builds up by charge of condenser 138 through resistance 136. The potential conditions at the anode of the thyratron are indicated at A in Figure 7 which shows the gradual build-up of anode potential and the sudden drop resulting when the tube fires, there being omitted indication of pulsing during the period through which the segments 108 remain grounded.

Upon ionization the thyratron transmits through condenser 140 a sharp negative pulse to the scaling stage 142 of conventional type which comprises the triodes 144 and 146, the anode of one being connected to the grid of the other by the respective resistance-capacitance arrangements at 148 and 150. The grids of triodes 144 and 146 are connected to the condenser 140 through resistances 152 and 154, the junction being connected to the negative potential supply line through resistance 156.

In the usual fashion the large negative pulses, resulting from initial firing of the thyratron in each cycle, through condenser 140 produce successive conductivity of the triodes 144 and 146. Whenever the triodes 144 becomes conductive its anode emits a negative pulse through condenser 158 to a second scaling stage indicated at 160 and comprising the triodes 162 and 164 similar to the scaling stage 142, the anodes and grids being cross connected by the condenser-resistance arrangements 166 and 168, the grids of the triodes being connected through resistances 170 and 172 to the condenser 158 and to the negative supply line through resistance 174.

The anode of triode 162 is connected through the condenser-resistance arrangement 168 and condenser 176, diode 178 and switch 180 to either of alternative contacts at 198 and 200 which are respectively connected to the grids of triodes 182 and 184 in a third scaling stage indicated generally at 186. Here again the anodes and grids are cross connected through the condenser-resistance networks 188 and 190. The grids of triodes 182 and 184 are connected through resistances 192 and 194 to each other and to the negative supply line through resistance 196. The diode 178 transmits only negative pulses from the condenser 176 and these pulses are delivered primarily to either the grid of triode 182 or the grid of triode 184 depending upon the position of switch 180. Accordingly, upon the delivery of successive negative pulses from the anode of triode 162, the scaling stage 186 is thrown to a new state only when the switch 180 is in such position as to transmit the negative pulse to the particular triode which is conducting. A negative pulse transmitted to a triode which is not conducting will have no effect. The result therefore is to produce a change in this scaling stage after the switch 180 is thrown to an alternative position but then only at the time when triode 162 becomes conducting. The switch 180 is adapted to be thrown manually (or possibly automatically as described hereafter) but when thrown to its alternative position nothing occurs until a negative pulse is transmitted as aforesaid. The result is to provide changes of state of the scaling stage 186 only at timed instants as will appear hereafter.

A triode 202 has its grid connected to the grid of triode 144 and in its anode circuit is the coil 204 of a relay, the armature 206 of which is adapted to move between contacts 208 and 210, the armature normally making contact with the former when the coil is deenergized. The contact 210 is connected to a terminal 214 referred to hereafter. The contact 208 is connected through a switch 212, which may alternatively be connected to the contact 210, the switch being connected through 216 to the armature 218 of a relay having a coil 220 and a contact 222 with which the armature engages when the coil is energized. Contact 222 is connected to a terminal 224, referred to hereafter. The coil 220 is in the anode circuit of a triode 226 the control grid of which is connected to the grid of triode 182. Energized condition of coil 220 is desirably indicated by the shunting neon lamp 228, which is illuminated when the coil is energized.

A triode 230 has its control grid connected to the grid of triode 162 and in its anode circuit there is provided the coil 232 of a relay having an armature 234 arranged to engage contact 236 when coil 232 is energized. Contact 236 is connected to a terminal 238 referred to hereafter. As will be noted the armatures 206 and 234 are connected to a negative low potential supply line which serves for control of relays as will hereafter appear.

Figure 7:
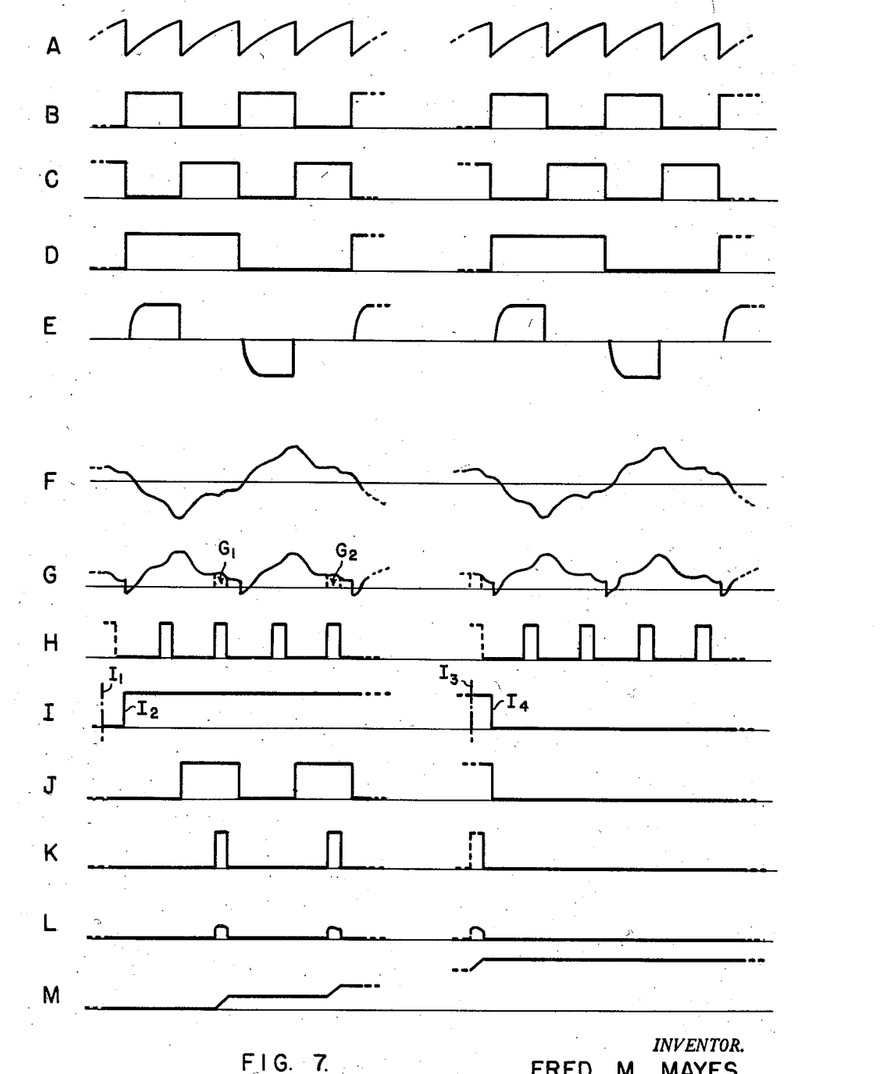
Figure 7 is a diagram illustrative of various characteristics of the apparatus in a cycle of operation.

Various characteristics of the timing circuit will be apparent from Figure 7 in which time is the abscissa. At B there is indicated by the rise of the curve flow of current in trodes 144 and 202 and in relay 204, and this curve may also be taken to represent the application of potential to terminal 214. As will hereafter appear it also represents energization of a relay coil 260 shown in Figure 5.

The curve C represents conductivity of triode 146 and period of delivery of supply potential through switch 212 and line 216 to the armature 218 of the right hand relay illustrated in Figure 5, when switch 212 is in the position shown.

The curve at D represents by its rise conductivity of triodes 162 and 230, energization of relay coil 232, and energization of terminal 238. As will appear hereafter this also represents energization of relay coils 246 and 248 of Figure 5 and of relay coil 324 of Figure 6.

In Figure 5 there is also illustrated a circuit arrangement for providing direct current between electrodes in the earth. There is indicated at 240 a block representing an adjustable regulated D. C. current source. This source may be of various types, for example a closely regulated D. C. generator, but for the present type of circuit it may more conveniently be provided by a thyratron power arrangement supplied with alternating current, preferably multi-phase, with adjustment of the current by regulation of phase of the input to the thyratron grids. It may be here remarked that with the apparatus of the type herein described, the current requirements are very considerably less than in the case of electrical prospecting circuits heretofore used. Consequently a thyratron type of supply with phase regulation of current is particularly applicable. Direct current is provided from the source at terminals 242 and 244 which are respectively connected to the armatures 250 and 252 of a pair of relays having operating coils 246 and 248. As is indicated in Figure 5 the armature contacts are so arranged as to provide for reversal of current to the terminals 254 and 256. Energization of coils 246 and 248 is derived from terminal 238. Accordingly, the coils are energized in accordance with the curve indicated at D in Figure 7, a reversal of current taking place in each half cycle corresponding to two revolutions of the commutating shaft 118.

The current supplied at terminals 254 and 256 would be in the form of a rectangular wave which always provides either positive or negative current flow. While such a current may be introduced into the earth, it is generally more desirable to provide variations of current corresponding approximately to quarters of the complete cycle, i. e., current should flow in one direction during the first quarter of a cycle, the current should then be cut off for the next quarter, current should flow in reverse direction for the third quarter, and should be cut off through the fourth quarter. The practical reason for this is that when current begins to flow, transients will exist, particularly if the current electrodes are widely spaced, for a substantial period before a steady state of flow ensues. On the other hand, when current is cut off, the current flow ceases very promptly with a corresponding very short transient before the steady state condition of no current flow through the electrodes takes place. (The above, of course, refers to the current passing through the electrodes; actually, the current flow in the earth will persist in the form of transients for some period and, in fact, it is due to this that transient potential conditions arise.) By reason of the foregoing it is usually desirable to have the transients to be measured in the earth result from a cessation of electrode current flow. Consequently, in line with the type of current wave just mentioned it is desirable to establish current flow through the first and third quarters of a cycle and to make potential measurements of the earth transients during the second and fourth quarters when no current is flowing through the current electrodes.

To attain this last end the terminal 254 is connected to the armature 258 of a relay having its energizing coil 260 connected between ground and the terminal 214. Terminal 256 is connected to an output terminal 266 while the upper contact of the relay is connected to the output terminal 262, the two terminals last mentioned being connected to a pair of current electrodes in the prospecting configuration. The contact connected with terminal 262 is engaged with the armature when the coil 260 is energized. Desirably there is another contact which is engaged when the armature 258 is released, and this contact is desirably connected to a dummy load resistance 264. The dummy load resistance is desirably adjustable so that it can be made approximately equal to the actual ground load resistance to minimize disturbances.

It has been mentioned that the current variations are approximately in conformity with quarters of a cycle. It is desirable to interrupt current supply from the source 240 at times of reversal to prevent arcing at the reversing relay contacts, and to this end bias is provided to the grids of the supply thyratrons through connection 241 joined to the segments 110. The current flows are thus confined to slightly less than quarter cycles.

The resulting current flow to the electrodes from terminals 262 and 266 is represented at E in Figure 7 wherein the transient occurring at the establishment of flow are accentuated in comparison with the sharp break of current flow occurring when the armature 258 is released by reason of deenergization of coil 260.

Figure 4:
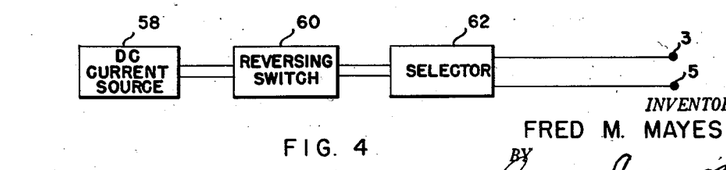
Figure 4 is a block diagram illustrating the control of current introduced into the earth.

For convenience of reference the current supply arrangement is diagrammed in Figure 4 in which the block 58 corresponds to the source previously described and referred to at 240, the reversing switch arrangement is diagrammed at 60, and the selector involving the relay armature 258 is diagrammed at 62. The arrangement is indicated as providing current to the current electrodes 3 and 5 of Figure 1. Desirably, a suitable meter is provided for the reading of the current, this meter not being indicated in the figures.

There is indicated at F in Figure 7 the type of transient which may be regarded as appearing between a pair of potential electrodes such as 9 and 11. In the absence of anomalies it would be expected that if this potential was produced by the type of current input wave shown at E in Figure 7, it would consist substantially of approximately exponential segments rising in one direction with application of current flow in one direction, falling after cessation of said current flow then building up in the opposite direction upon reversal of current flow and again falling upon cessation of current flow. In the event that anomalies are present and within the range of the apparatus the potential curve will be irregular, as exaggeratedly shown at F, showing, in effect, reflections and other characteristics due to the inhomogeneity of the region of the earth under observation. As will be evident from the curve at F, an alternating wave will be expected having similar positive and negative half cycles.

Figure 6:
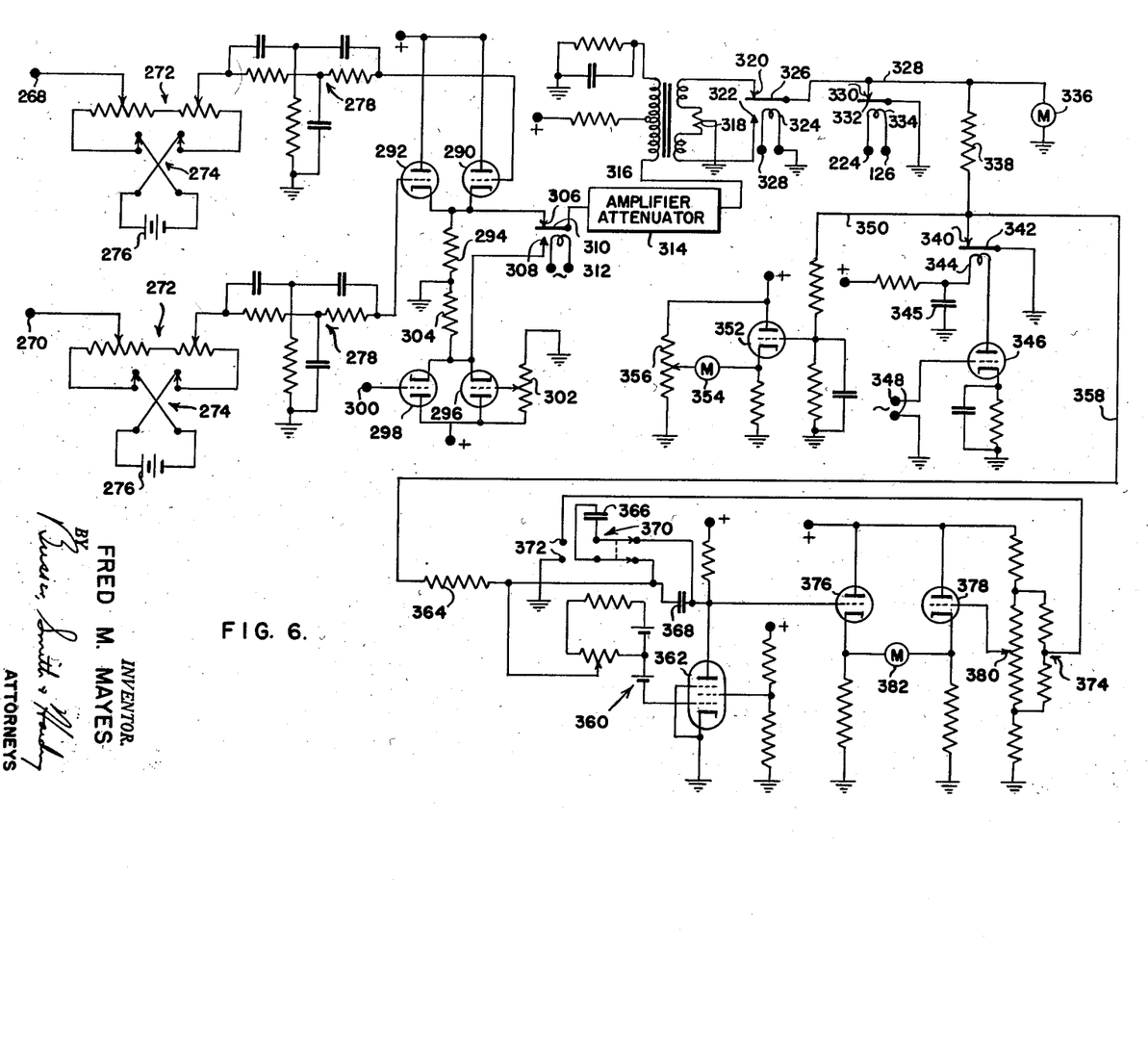
Figure 6 is a wiring diagram showing in particular portions of an apparatus for receiving earth potentials and for providing integration of responses to transients.

Referring now to Figure 6, there are indicated at 268 and 270 terminals which are connected to a pair of potential electrodes between which potential variations are to be measured. The particular arrangement illustrated in Figure 6 is adapted to the measurement of the potentials in the configurations of Figures 1 and 2, in which case the terminals 268 and 270 would be connected to the electrodes 11 and 13 (or 11' and 13'), the electrode 9 (or 9') being considered ground. The system in Figure 6, therefore, would be substituted for the combination of meters 15 and 17 (or 15' and 17') diagrammed in Figures 1 and 2. Each of the terminals 268 and 270 is connected to a direct potential bucking network comprising an arrangement of potentiometers 272 associated with a reversing switch 274 and a battery 276. By such arrangements, direct constant potentials appearing at the terminals may be bucked out. The signals from the terminals 268 and 270 are then fed through filter networks indicated at 278 which are desirably designed to reduce as far as possible major alternating current components in the earth such as may be due to power lines. For example, if the work is being done in the vicinity of a sixty cycle power line, the filters 278 will be so designed as to suppress signals of that frequency. Generally, as has been indicated heretofore, frequencies used for the prospecting will be considerably lower, generally less than twenty cycles per second.

The signals thus filtered are applied to the grids of triodes 290 and 292, the cathodes of which are connected together and to ground through a resistor 294. Another pair of triodes 296 and 298 are desirably provided, with their cathodes connected together and to ground through a resistor 304. The grid of triode 298 may be connected to a terminal 300 to which signals may be applied for testing and adjustment purposes. The grid of triode 296 is connected to the adjustable contact of a potentiometer 302 which is connected between the positive supply terminal and ground and serves to provide a direct reference potential at the cathodes of the triodes 296 and 298. The cathodes of the two pairs of triodes are connected respectively to the contacts 306 and 308 of a chopper relay having an armature 310 arranged to be vibrated by the coil 312. This coil is energized with alternating current at a frequency which may, for example, be about fifty-seven cycles per second in the event that the power lines in the vicinity carry sixty cycle current. This difference in frequency is sufficient to eliminate spurious signals due to power line frequency. As will be evident from Figure 6, the armature 310 is caused by the exciting coil 312 to engage alternately the contacts 306 and 308 at the input frequency to the coil.

The chopped signal from the armature 310 passes to an amplifier-attenuator of conventional type indicated by the block at 314. This involves an alternating current amplifier which may be tuned for selective amplification at the chopping frequency. Attenuator arrangements are desirably incorporated so as to provide for convenient level of the output. The output is fed through a transformer arrangement indicated at 316 which incorporates a potentiometer 318 having its adjustable contact grounded and serving to produce a proper balance of the signals which are delivered from the transformer secondary to the contacts 320 and 322. These contacts are incorporated in a reversing relay having an armature 326 and a coil 324 which is energized from the terminal 238 previously described in connection with Figure 5. As will be evident from the foregoing description this provides a reversal of phase of the signals which are delivered to the line 328 from the armature 326.

The reversal is in accordance with the cycle illustrated at D in Figure 7. Neglecting the chopping which has occurred, there will therefore be produced a rectifying action which will result in an output to line 328 corresponding to G in Figure 7.

The line 328 is connected to a relay contact 330 which is engageable by the armature 332 when the operating coil 334 is deenergized. The armature 332 is grounded. The coil 334 has its terminals connected to the terminals 224 and 126 of Figure 5. As will appear hereafter, this provides for signals at other than ground value only during predetermined intervals. An alternating current meter 336 may be connected to the line 328 for checking and testing purposes. The line 328 is connected to a contact 340 of a relay through a resistance 338. The relay is provided with an armature 342 which is grounded and with an energizing coil 344 which is connected in the anode circuit of a triode 346 the grid of which receives signals from terminals 348 which are connected to the same alternating current source as that which energizes the coil 312. The triode 346 is provided to secure sufficient amplification to cause sharp reversals of position of the armature 342, and the action is such as to provide for synchronous rectification of the chopped signals originating at the relay containing the coil 312.

The thus rectified signals appearing at contact 340 are fed through line 350 to the grid of a triode 352 provided with a cathode load resistor, the cathode being connected through a direct current meter 354 to the variable contact of a potentiometer 356 connected between a positive supply terminal and ground, the potentiometer being provided to secure a zero balance. The meter 354 is convenient to provide measurement of the signals for checking and test purposes.

The measurements of particular interest are, however, taken from an integrating arrangement. For this purpose the contact 340 is connected through line 358 to an integrator generally indicated at 360 and which may conveniently be of the Miller type. This integrator operates in generally conventional fashion and comprises the pentode 362 having conventional connections. Integration is achieved by feeding the signals from line 358 through a resistance 364 to an arrangement of a relatively large condenser 366 and a relatively small condenser 368. The condenser 366 during integration is connected to the condenser 368 through the double pole double throw switch 370, which in its alternative position connects to contacts 372 which are respectively connected to ground and to a point of fixed positive potential of a network 374. This arrangement is provided for resetting of the integrator.

The output from the integrator, taken from the anode of the pentode 362, is fed to the grid of a triode 376 associated with a second triode 378. Each of these triodes is provided with a cathode load resistor, and the cathodes are connected to the terminals of a meter 382 which, desirably, is of a recording type. Zeroizing is accomplished through adjustment of the contact 380 of a potentiometer, the contact being connected to the grid of triode 378.

Terminal 126 is periodically connected to ground through the commutator of the timer, and is connected to ground four times in each complete cycle of operation of the apparatus, that is upon each revolution of the commutator brush assembly. The periods of such grounding are indicated in Figure 7 at H. The duration of the grounded period is determined by the selection of the switches 122A to 122E, which selection also determines the portion of the quarter phase of operation in which grounding occurs. Considering, for example, clockwise rotation of shaft 118 in Figure 5, let it be assumed that the switch 122D alone is closed. In such case grounding will occur during the period represented at D on the commutator, this period following the initiation of the cycle occurring when the brushes 16 first engage the segments 108 by an interval of approximately ⅜ of a revolution. The duration of grounding is the duration of brush contact with the conducting segments in the section D of the commutator. If it is desired that the grounded intervals be longer, then two of the switches may be closed or even more for still longer intervals. In short, it will be evident that the arrangement provides for selection of a particular portion of each quarter phase of the complete cycle.

Assuming that the terminal 224 was continuously energized, it will be evident that the action of the relay armature 332 would be such as to provide through line 358 the portions of the rectified wave occurring in the selected portion of each quarter phase of the complete cycle, i. e., sampling would occur of the wave indicated at G in Figure 7 during the period of each of the pulses indicated at H.

Assuming, however, a usual mode of operation, the terminal 224 is not continuously energized. First, it is energized only during periods determined by the location of switch 180 in contact with terminal 200. The mere engagement of terminal 200 by switch 180, however, does not determine the period of energization of relay 220, but rather after the switch 180 is brought into contact with terminal 200, energization of coil 220 occurs upon the next rise of the curve indicated at D. Energization then continues until the first rise of the curve at D following the movement of switch 180 to the alternate stopping terminal 198. The result is that the relay 220 is energized only during complete cycles the number of which is determined by the shifting of the switch 180 to terminal 200 followed by its shift to the stopping terminal 198. The condition of relay 220 is indicated at I in Figure 7 wherein $I_1$ represents the instant of shifting of the switch 180 to terminal 200, followed at $I_2$ by the energization of relay 220. This energization continues until, following the instant $I_3$ when the switch is moved to terminal 198, the relay coil is deenergized at $I_4$ and thereafter remains deenergized until the switch is again shifted. It will be evident that any number of complete cycles under control of the operator may intervene between $I_2$ and $I_4$.

The relay 220, however, does not alone control the energization of terminal 224. The energization of this terminal is additionally under control of relay 204, energization occurring only when the coil 204 is deenergized with switch 212 in the position shown, which deenergized condition is indicated at C in Figure 7. It will thus be seen that energization of terminal 224 which is illustrated at J in Figure 7 occurs only during quarter periods determined by the conditions existing at C and I. In short, particular quarter cycles are chosen, these being in the particular instance illustrated, the second and fourth quarters occurring during periods of energization of relay 220.

It follows that the relay contact 332 is moved from ungrounded position to provide an input at line 328 corresponding to the pulse periods indicated at K in Figure 7, i. e. during particular chosen portions of the quarter cycles determined as just described.

The resulting input through line 358 will then consist of samples of the curve at G indicated at $G_1$, $G_2$ etc., these being shown at L in Figure 7. Actually, of course, these samples will each consist of a number of synchronously rectified pulses.

It may be noted that the synchronous rectification is subject to phase shifting by a condenser 345 which is selected to give the desired phase relation between the original chopping and the rectification.

The curve M indicates the action of the integrator assuming that the input thereto is in the nature of the pulses indicated at L. As will be evident, the integration takes place only over the running periods under control of the switch 180.

Figure 3:
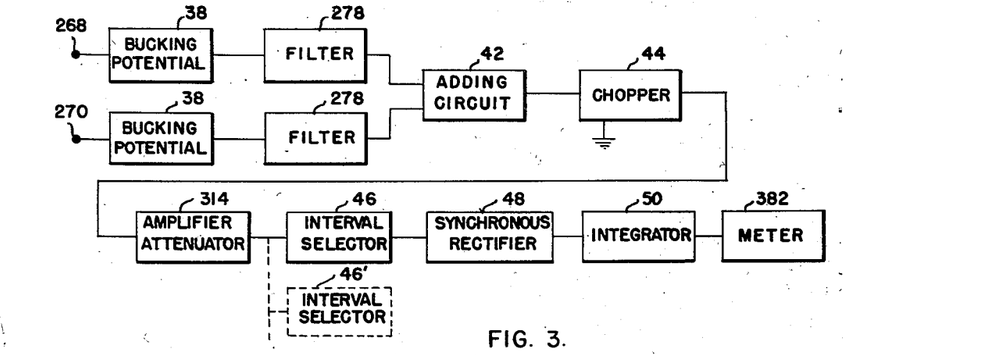
Figure 3 is a block diagram indicating in particular an apparatus desirably associated with a potential pickup system provided in accordance with the invention.

To simplify reference, the circuit of Figure 6 is illustrated in block diagram in Figure 3. The terminals 268 and 270 are connected to the bucking potential networks 38 and the filters 278. The outputs from the filters are fed to the adding circuit 42 which in the wiring diagram comprises the triodes 290 and 292. This, in turn, is followed by the chopper 44, the amplifier-attenuator 314, the interval selector 46, the synchronous rectifier 48, the integrator 50, and the meter 382. Since in a single run of the apparatus it may be desirable to compare the outputs for a number of different intervals, the diagram in Figure 3 indicates that a plurality of interval selectors 46 and 46′ may follow the amplifier-attenuator 314, being in turn followed by corresponding elements leading to a plurality of meters 382. It has been found convenient to use, for example, five interval selectors and their associated following components. Suitable switching may be provided when such a plurality of interval selectors is used.

The input arrangement of Figure 6, diagrammed in Figure 3, involves the measurement of the sum of the potentials appearing at electrodes 11 and 13 (or 11′ and 13′) with respect to that appearing at electrode 9 (or 9′). Using a symmetrical electrode configuration such as that of Figure 1 in homogeneous regions, the potential at electrode 9 may be considered zero and it will be evident that the instantaneous potentials at electrodes 11 and 13 due to the input current from electrodes 3 and 5 would be equal in magnitude and opposite in sign with respect to ground. The sum, therefore, would, under such conditions, be zero. An asymmetry in the earth would become apparent from deviation of the sum of these potentials from zero, and the circuit is therefore aptly arranged to amplify and integrate the deviations from a zero sum of the potentials. The provision of the bucking arrangements and filters is to avoid overloading of the circuit elements and a high degree of sensitivity is thus attainable. If, within the geometrical range of the configuration and within a spacing corresponding to the delay of the measured interval following the transient which initiates the potential transient, there is some anomaly in the earth's structure, the result will be an output signal, other than zero, which will have an interpretable relationship to the anomaly.

Suppose now that an actual potential difference shows up but not during intervals which are closely following the current transients, but rather only in the measurement of intervals which are substantially delayed. A deduction from this situation may be made to the effect that the anomaly which gives rise to the potential difference is deep in the earth and the extent of this depth may be at least approximately determined from the delay required before the potential difference appears. By changing the frequency of the cycles of operation, the transient characteristic indicative of the anomaly may be accentuated. In this way, by choice of frequency and delay involved in the measurements, there may be accentuated anomlies of special interest, these, of course, also being searched for by displacements of the entire configuration either along the line of the electrodes or transverse thereto.

It is evident that in the absence of disturbing earth currents the foregoing measurements could be made utilizing only a single cycle of current pulse and measurement of the transients due to that single cycle. This condition, however, is not one which can usually be found and if such a single cycle measurement was attempted the resulting potential sum measurement would generally be completely obscured in the electrical earth noise consisting generally of varying direct components and cyclical components of low frequencies. For this reason, it is desirable to use repeated sampling such as has been described, in which the samples of potential from each cycle may constitute only a small contribution to an integrated summation of these samples. As will be evident if integration is carried out over a large number of cycles the disturbing electrical noise will be effectively balanced out. This will be the case except for the very unusual case in which that noise would have the same frequency as, or would have a frequency harmonically related to, the frequency of repetition of the measuring cycle. By integrating over a definite number of cycles, therefore, there may be secured a true picture of the transient response in the delay interval which is provided. The number of cycles may be controlled and determined by observation of the neon lamp 228, or alternatively, the shift of the switch 180 may be automatically controlled by a timer to take care of integration over a definite number of cycles.

While particular reference has been made to measurement during periods in which flow of current through the current electrodes into the earth is interrupted, it will be evident that with suitable switching, as at 212, or interchange of various terminals of the timing arrangement of Figure 5 the measurements may, if desired, be made during the periods of electrode current flow. Furthermore, by obvious changes in the timing circuit arrangement, it will be evident that the complete cycles may be made such that electrode current is flowing continuously in either one direction or the other without interposition of periods of no flow. In particular it will be evident that connections for such purposes may be provided utilizing the commutator segments 110, 108, 112 and 114 in various arrangements other than that illustrated. The apparatus is highly flexible to secure many desired characteristics of operation.

Of particular significance at times is the steady state response of the configuration. If the cycles of current application are long, then the sampling of potential conditions near the end of each period during which the applied current is flowing will give a measurement of the steady state conditions. By utilization of the described circuit, with sampling as just indicated and integration, there may be secured measurements which would be equivalent to those obtained if the current was continuously flowing and potentials were measured under conditions of absence of disturbing stray earth currents. Such ideal conditions cannot, of course, be attained, but by the ues of the present apparatus measurements may be made which would be equivalent to measurements made under the ideal conditions, the integration of repeated samples serving effectively to eliminate the effect of stray currents which would make direct current measurements impossible.

It will be evident that the use of the improved configurations and of the apparatus which has been described is applicable to measurements along boreholes as well as surface measurements, to determine, for example, the slope of penetrated strata or the locations of faults or other anomalies which may exist in the general vicinity of the hole. The electrodes in such case would be suspended in fixed relative array within the borehole by means of conducting cables by which they could be raised and lowered through the hole. The potential electrodes only need be so raised or lowered, if desired, the current being introduced into the region of the borehole at the surface or by means of one remote electrode at the surface and another within the borehole, or between adjacent boreholes, or the like. The advantages of the potential electrode configuration would still exist, in that stray currents, uniform in the region of exploration, would be effectively cancelled out.

What is claimed is:

1. Apparatus for electrical prospecting comprising a pair of current electrodes in electrical contact with the earth, means for introducing current into the earth through said electrodes, a pair of potential electrodes in electrical contact with the earth and symmetrically disposed relative to a point centrally located with respect to said current electrodes, and measuring means responsive to the algebraic sum of the potentials of said potential electrodes with respect to a common datum.

2. Apparatus for electrical prospecting comprising a pair of current electrodes in electrical contact with the earth, means for introducing current into the earth through said electrodes, a pair of potential electrodes in electrical contact with the earth and symmetrically disposed relative to a point centrally located with respect to said current electrodes, a third potential electrode located in electrical contact with the earth at said central point, and measuring means responsive to the potentials of said pair of potential electrodes with respect to said third potential electrode.

3. Apparatus for electrical prospecting comprising a pair of current electrodes in electrical contact with the earth, means for introducing current into the earth through said electrodes, a pair of potential electrodes in electrical contact with the earth and symmetrically disposed relative to a point centrally located with respect to said current electrodes, a third potential electrode located in electrical contact with the earth at said central point, and measuring means responsive to the algebraic sum of the potentials of said pair of potential electrodes relatively to the potential of said third potential electrode.

4. A method of electrical prospecting comprising locating a pair of current electrodes in electrical contact with the earth, locating a pair of potential electrodes in electrical contact with the earth and symmetrically disposed relative to a point centrally located with respect to said current electrodes, providing current flow into the earth through said current electrodes, and measuring the potentials of said potential electrodes with respect to a common datum.

5. A method of electrical prospecting comprising locating a pair of current electrodes in electrical contact with the earth, locating a pair of potential electrodes in electrical contact with the earth and symmetrically disposed relative to a point centrally located with respect to said current electrodes, providing current flow into the earth through said current electrodes, and measuring the algebraic sum of the potentials of said potential electrodes with respect to a common datum.

6. A method of electrical prospecting comprising locating a pair of current electrodes in electrical contact with the earth, locating a pair of potential electrodes in electrical contact with the earth and symmetrically disposed relative to a point centrally located with respect to said current electrodes, locating a third potential electrode in electrical contact with the earth at said central point, providing current flow into the earth through said current electrodes, and measuring the potentials of said pair of potential electrodes with respect to said third potential electrode.

7. A method of electrical prospecting comprising locating a pair of current electrodes in electrical contact with the earth, locating a pair of potential electrodes in electrical contact with the earth and symmetrically disposed relative to a point centrally located with respect to said current electrodes, locating a third potential electrode in electrical contact with the earth at said central point, providing current flow into the earth through said current electrodes, and measuring the algebraic sum of the potentials of said pair of potential electrodes relatively to the potential of said third potential electrode.

8. Apparatus for electrical prospecting comprising means for introducing current into the earth, three potential electrodes located in electrical contact with the earth in the field of said current comprising a central electrode and a pair of outer electrodes substantially equidistant from said central electrode and oppositely located relative thereto, and measuring means providing an output which is a function of the sum of the potentials of said outer electrodes with respect to said central electrode.

9. A method of electrical prospecting comprising introducing current into the earth, providing three potential electrodes in electrical contact with the earth in the field of said current, said electrodes comprising a central electrode and a pair of outer electrodes substantially equidistant from said central electrode and oppositely located relative thereto, and measuring the sum of the potentials of said outer electrodes with respect to said central electrode.

References Cited in the file of this patent
UNITED STATES PATENTS

| | | |
|---|---|---|
| 2,086,737 | Pearson | July 13, 1937 |
| 2,440,693 | Lee | May 4, 1948 |
| 2,575,349 | Lee | Nov. 20, 1951 |